United States Patent [19]

Dickey et al.

[11] Patent Number: 4,796,150

[45] Date of Patent: Jan. 3, 1989

[54] TELECOMMUNICATION PROTECTOR UNIT WITH PIVOTAL SURGE PROTECTOR

[75] Inventors: Larry W. Dickey, Hackettstown; Warren J. Rhines, Convent Station, both of N.J.

[73] Assignee: American Telephone and Telegraph Company, AT&T Bell Laboratories, Murray Hill, N.J.

[21] Appl. No.: 105,461

[22] Filed: Oct. 2, 1987

Related U.S. Application Data

[63] Continuation of Ser. No. 40,708, Apr. 16, 1987, abandoned, which is a continuation of Ser. No. 752,093, Jul. 5, 1985, abandoned.

[51] Int. Cl.[4] .......... H02H 3/22

[52] U.S. Cl. .......... 361/119; 361/91; 361/331

[58] Field of Search .......... 361/54, 56, 103, 104, 361/111, 117–119, 125, 331, 380, 386, 388, 427

[56] References Cited

U.S. PATENT DOCUMENTS

| | | | |
|---|---|---|---|
| 4,071,876 | 1/1978 | Benson et al. | 361/331 X |
| 4,082,407 | 4/1978 | Smorzaniuk et al. | 361/338 X |
| 4,168,515 | 9/1979 | Baumbach | 361/119 X |
| 4,215,381 | 7/1980 | Heisinger | 361/119 X |
| 4,322,767 | 3/1982 | Hamamsy et al. | 361/56 |
| 4,335,416 | 6/1982 | Hollfelder et al. | 361/119 |
| 4,408,248 | 10/1983 | Bulley et al. | 361/91 |
| 4,424,546 | 1/1984 | Smith | 361/119 |
| 4,434,449 | 2/1984 | Dickey | 361/124 |
| 4,458,288 | 7/1984 | Chapman, Jr. et al. | 361/119 X |
| 4,502,088 | 2/1985 | Baumbach | 361/119 X |
| 4,504,883 | 3/1985 | Uchida et al. | 361/331 X |
| 4,594,635 | 6/1986 | Scheithauer et al. | 361/119 |
| 4,626,955 | 12/1986 | Cwirzen | 361/119 |
| 4,658,325 | 4/1987 | Splitt | 361/119 |

*Primary Examiner*—M. H. Paschall
*Assistant Examiner*—A. Jonathan Wysocki
*Attorney, Agent, or Firm*—Patrick E. Roberts; Harry L. Newman

[57] ABSTRACT

A solid state protector unit has a single voltage protection device shared by both tip and ring conductors to protect telephone equipment in a central office or other location from surges of voltages in either tip, ring, or both tip and ring conductors. The voltage device has a surge-suppressor sandwiched between two metal plates. Each of these pairs of metal spring clips retain a pair of diodes in contact with and on opposite sides of the two metal plates. When a voltage surge exceeds a predetermined threshold, the surge-suppressor turns on and permits a current to flow through it to a ground, thereby protecting the telephone equipment from voltage surges. Heat generated for a sustained period from the voltage device or from the current device will cause the current device to be grounded permanently.

7 Claims, 9 Drawing Sheets

TELECOMMUNICATION PROTECTOR UNIT WITH PIVOTAL SURGE PROTECTOR

This is a continuation of application Ser. No. 040,708, filed Apr. 16, 1987 now abandoned which is a continuation of application Ser. No. 752,093 filed July 05, 1985, now abandoned.

TECHNICAL FIELD

This invention relates to protectors for use in telephone central offices or other locations to protect electrical circuits from excessive current increases and voltage surges.

BACKGROUND OF THE INVENTION

Protecting telecommunications equipment in telephone central offices or other locations against sneak currents and voltage surges is well known. Traditional protectors include carbon blocks and gas tubes. These protectors, however, have a wide spread in voltage breakdown levels and large variability with surge rise time. The life, furthermore, of a carbon block is limited. Gas tubes and carbon blocks protect either tip conductor or ring conductor but not balanced protection on both.

The problems with gas tubes and carbon blocks have been solved by using solid state devices. Solid state protectors have instantaneous response for all surges, longer life and provides balanced protection on both tip and ring for high voltages on either tip or ring. An example of a circuit for balanced protection is shown in U.S. Pat. No. 4,408,248 issued Oct. 4, 1983 to R. M. Bulley et al. An example of a solid state protector circuit is disclosed in U.S. Pat. No. 4,322,767 issued Mar. 30, 1982 to M. A. El Hamamsy et al. Solid state protectors would become practical if they were made to fit within substantially the same space occupied by a pair of traditional carbon blocks and gas tubes.

SUMMARY OF THE INVENTION

In accordance with the illustrative embodiment of this invention, there is disclosed a solid state protector for insertion in a telephone line having tip and ring conductors and used to protect equipment in a telephone central office or other locations from spurious currents and spurious voltages. The protector comprises a current unit, a voltage unit and a pair of springs assembled within a housing structure.

The invention resides in a single voltage unit with solid state devices that respond instantaneously to spurious voltage surges on the telephone line in the tip conductor, the ring conductor, or both tip and ring conductors. When a voltage surge exceeds a predetermined threshold, the voltage device operates to ground the telephone line thereby insuring that the spurious voltage bypasses the telephone equipment in the central office.

More particularly, the voltage device includes a self-triggering surge-suppressor (a single chip which combines a silicon controlled rectifier and a Zener diode) in a rugged disc package that is sandwiched between two metallic plates lodged in recesses within a shell. The shell has a plurality of posts protruding therefrom to mate with recesses within a cover. A surge-suppressor, two metallic plates, and six rectifier diodes are positioned within the shell. After the cover is installed over the shell, the posts are heat staked so that they bond with the cover. In the preferred embodiment, the shell and cover are fabricated from a suitable rigid polymeric material.

Each of three metallic spring clips retain a pair of diodes within recesses on opposite sides of the shell so that the diodes make direct contact with the metallic plates. Each end clip has an arm which reaches over and grips the top of the shell in such a manner as to make contact with the aforesaid springs.

A ground spring clip retains a third pair of diodes in contact with the metallic plate at a central position. This clip is gripped by the two arms of a grounding unit. The grounding unit is sandwiched between two halves of the base unit.

The bottom surface of each of the end spring clips has a ridge which rests on an upper flange of a sleeve. The sleeve is hollow and surrounds a line pin with which it is axially aligned and bonded thereto by some suitable solder having a predetermined melting point. Each line pin is retained within one of the aforesaid halves of the base which is fabricated from some suitable insulator. Surrounding the sleeve is a coil of insulated conductive wire, one end of which is welded to the upper flange of the sleeve and the other end of the coil is welded to a central office pin. Each central office pin is lodged, like the line pin, securely within one of the aforesaid halves of the insulator base.

When there appears a surge of spurious voltage across the telephone line, current therefrom will travel through the line pin to the sleeve, the ridge of the spring clip through a diode and to the metallic plate. The diodes are used in pairs to handle both positive and negative polarities of voltage. When a surge voltage exceeds a predetermined threshold, 260 volts in a typical embodiment, the surge-suppressor will begin conducting the surge currents to the second metallic plate in contact therewith then to a diode in contact with the second metallic plate. From this diode, the current proceeds to the ground spring clip and through the arms of the ground unit. Because of these electrical paths, the spurious voltages are grounded immediately to protect the sensitive equipment. This safe condition can be endured for several seconds and, if the spurious voltage ceases, the solid state protector returns to normal operation.

For further safety, when exposed to sustained high voltages, the solid state module triggers a thermal overload action. The heat generated from the surge-suppressor, the metallic plates, and the diodes will travel through the spring clip and the ridge therein to the sleeve. This heat will cause the solder to melt and release the sleeve from its bond to the line pin.

The force from the spring, in the preferred embodiment about one pound, will urge the voltage device to depress the now loosened sleeve immediately and forcefully downwards to make contact with a ground plate located upon the base unit.

An advantage of the unique geometry of the voltage device results in substantially controlled release of the sleeve to establish contact with ground potential thereby preventing damage to valuable central office equipment from surge voltages. Using ridges on the spring clips results in smooth pivot of the voltage device and prevents it from becoming bound against the side of the housing structure. Further, the ridges are a constant thermal path for various pivot angles. The ridges thus permit the voltage unit device to operate when either one or both sleeves have loosened from their bond to the line pins.

DETAILED DESCRIPTION

Figure 1:
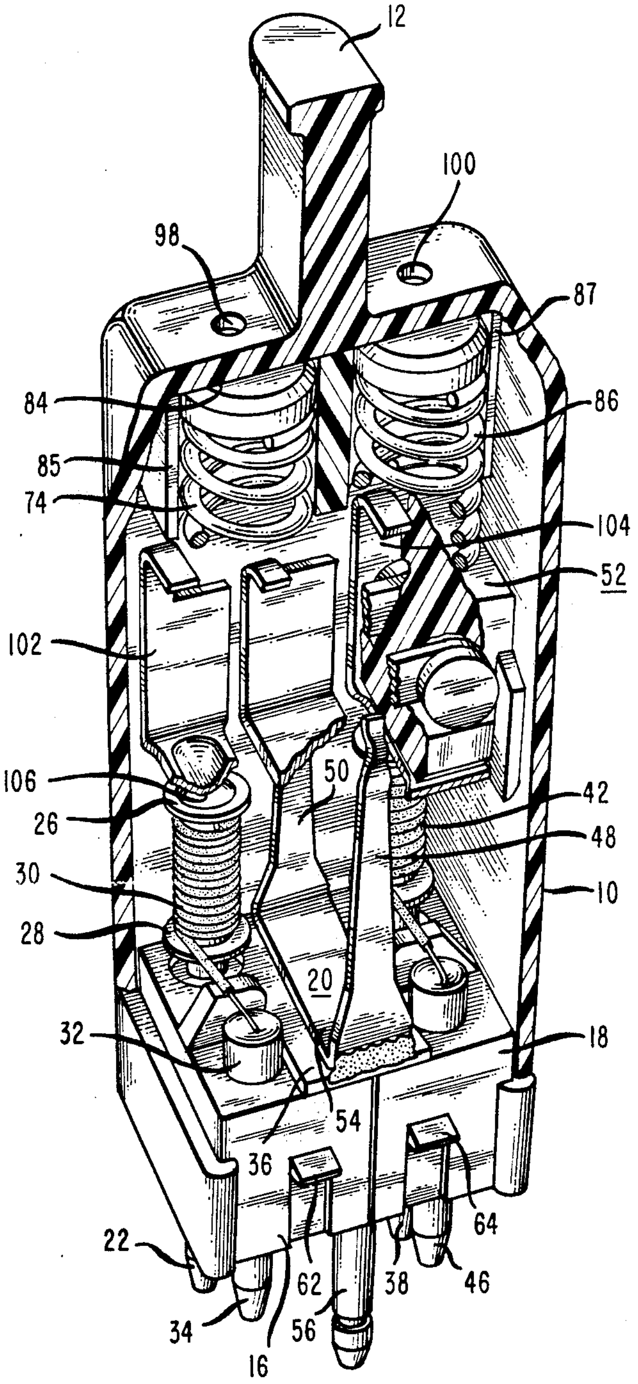
FIG. 1 is an isometric view of the solid state protector.
Figure 2:
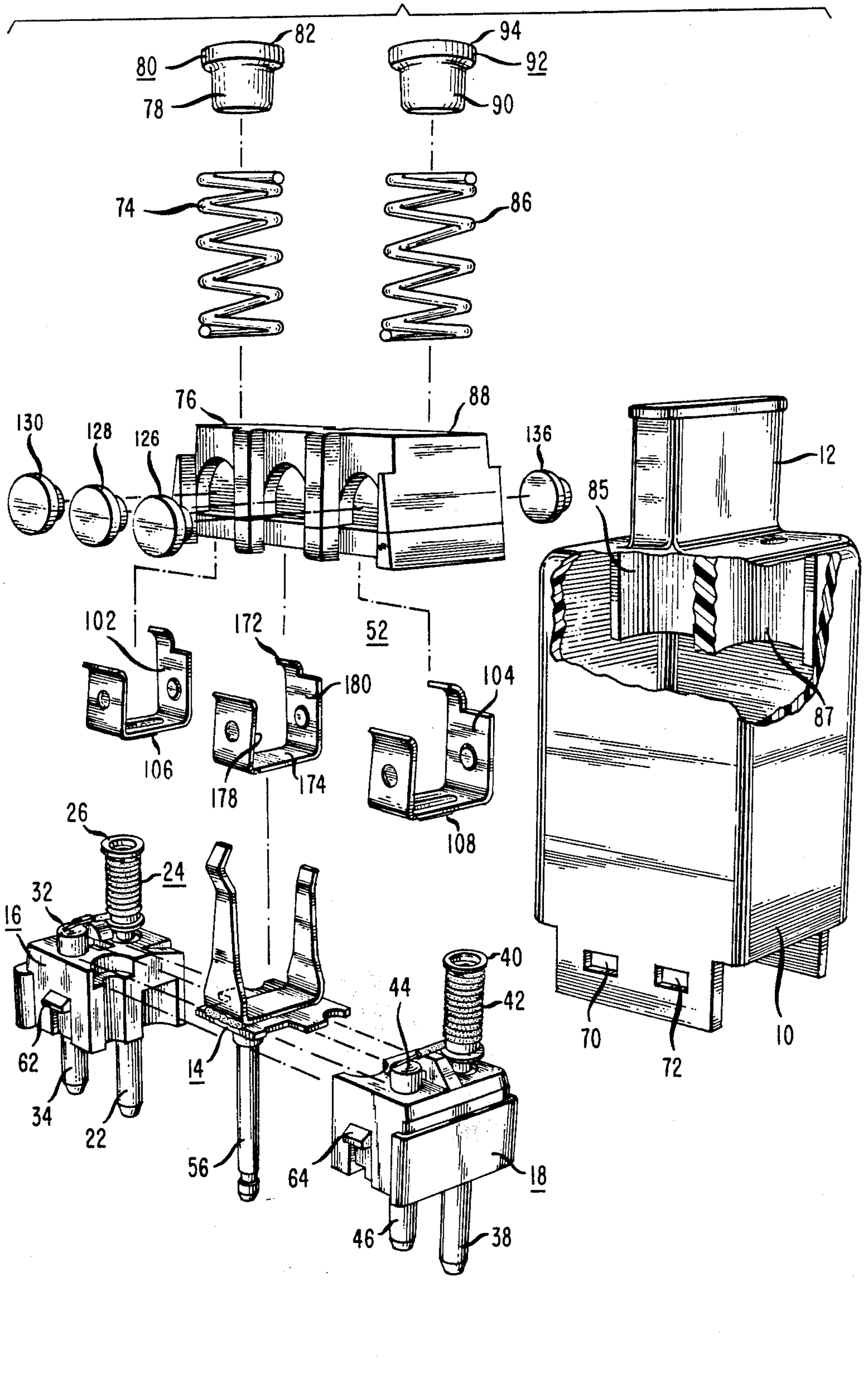
FIG. 2 is an exploded view of the solid state protector.
Figure 3:
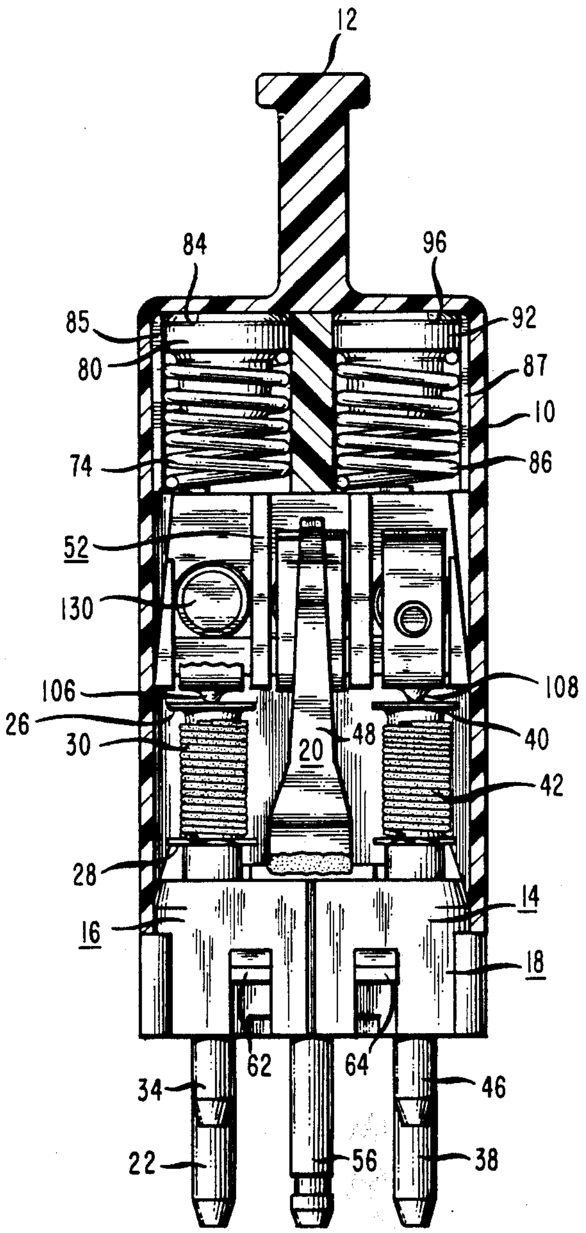
FIG. 3 is a front view of the solid state protector in partial section.

Referring collectively to FIGS. 1, 2, 3 and 4, there is shown a solid state protector which is used for protecting telecommunications equipment against spurious sneak currents and spurious surge voltages which appear in a line interconnecting a customer's equipment with a central office. The protector comprises a housing unit 10, fabricated from a plastic material, having a handle 12 which is used during insertion in or removal from a protector block as disclosed more fully in U.S. Pat. No. 4,434,449 issued Feb. 28, 1984 to Mr. Larry W. Dickey.

The protector comprises a base 14 fabricated from a plastic insulator and having left half 16 and right half 18. The two halves 16 and 18 are substantially mirror images of one another. Halves 16 and 18 interpose, respectively, a mechanism for protecting telecommunications equipment against spurious sneak currents in the tip and the ring conductor path of the line. Sandwiched between the two halves is a grounding unit 20 for conveying the spurious currents (or the spurious voltages) away from the telecommunications equipment (not shown) to ground.

Figure 4:
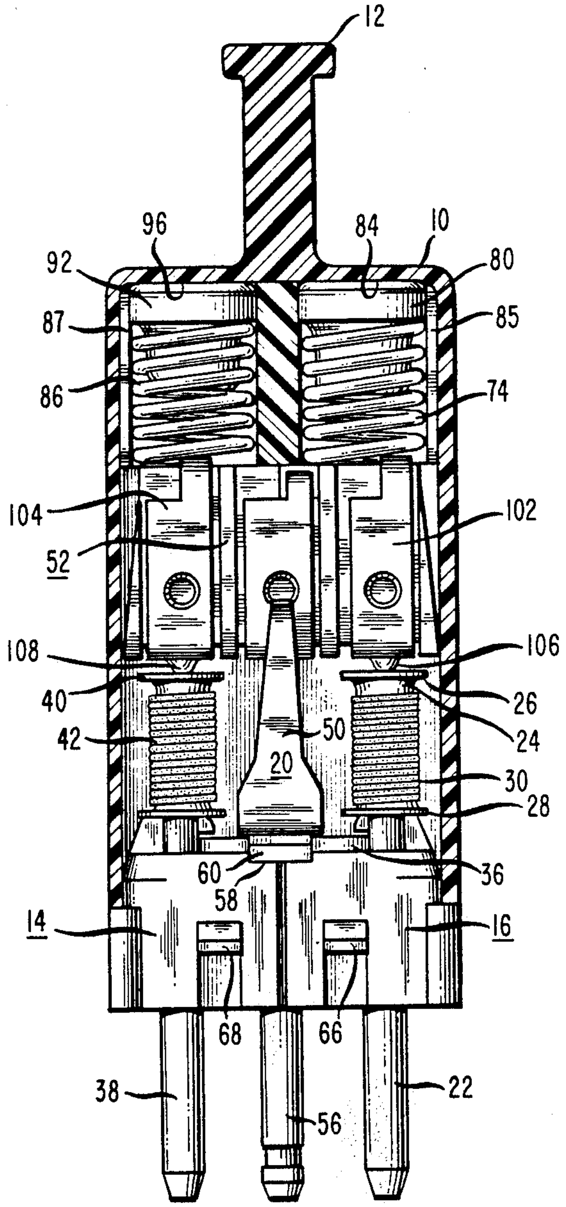
FIG. 4 is a rear view of the solid state protector in partial section.
Figure 5:
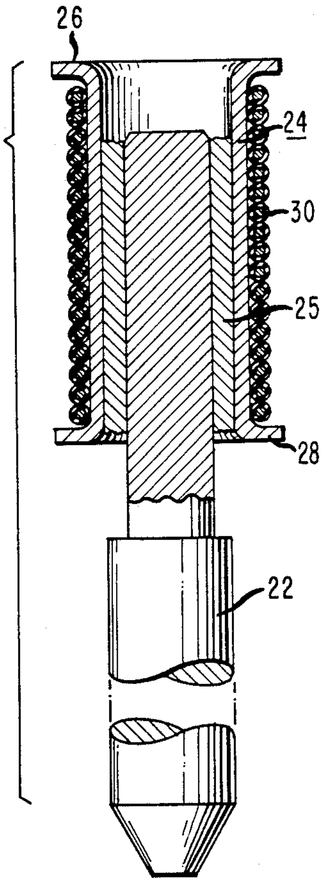
FIG. 5 is a view of the device for protection against spurious currents in the line.

The left half 16 of base 14 comprises line pin 22, on which one of the line conductors from the customer's equipment is terminated. Referring to FIG. 5, along with FIGS. 1 through 4, the upper part of line pin 22 is shown surrounded by the inner surface of spool or sleeve 24, aligned axially therewith, and bonded thereto by a fusible material such as solder 25, having a predetermined melting temperature. Sleeve 24 has an upper flange 26 and a lower flange 28. A coil of insulated wire 30 is wound around the outer surface of sleeve 24. One end of coil 30 is welded to the under surface of sleeve 24 while the other end of coil 30 is welded onto the upper end 32 of central office pin 34.

Line pin 22 and central office pin 34 are fabricated from copper alloy which is plated first with paladium and then with gold. Sleeve 24 is made from a good conducting material. Coil 30 is a wire fabricated from an alloy such as nichrome which is covered with nylon insulation.

The normal flow of current between a customer's equipment and central office equipment will traverse line pin 22, solder 25, spool 26, coil 30 and central office pin 34. In response to a spurious excessive current in the line, heat generated in coil 30 will cause solder 25 to melt and release spool 24 from its bond with line pin 22. Spool 24 will then be forced downwards, as will be disclosed more fully hereinbelow, to make contact with plate 36 of grounding unit 20.

Likewise, referring to FIGS. 1 through 4, the current path in the other conductor in the customer's line through the right half 18 of base 14 will traverse line pin 38, sleeve 40, coil 42, central office pin 46 and then to the central office equipment. When a spurious current develops in the line, the heat generated as current flows through coil 42 will cause the solder bonding sleeve 40 to line pin 38 to melt and sleeve 40 therefrom. Sleeve 40 will then make contact with ground plate 36 in a manner to be described more fully hereinbelow.

Grounding unit 20 comprises a spring having front arm 48 and rear arm 50 formed from a single sheet of temper hard copper. The two arms provide two functions: 1) they secure surge voltage protection device 52 in place and 2) they provide a path to ground for the surge voltages. The two arms 48 and 50 are joined by central plate 54 which is welded to ground plate 36. Ground plate 36 is securely fastened to a grounding pin 56. Grounding unit 20 is secured between the left half 16 and right half 18 of base 14. Referring more particularly to FIG. 4, there is shown a recess 58 into which a projection 60 of grounding plate 36 fits in order to prevent the grounding plate from accidental movement in either direction and touching any conductive material on either left half 16 or right half 18 of base 14.

Left half 16 and right half 18 of base 14 have, respectively, tangs 62 and 64 which snap into recesses 70 and 72 of housing 10 to secure the protector components firmly therein. The rear of left half 16 and right half 18, likewise, have tangs 66 and 68 to snap into corresponding recesses (not shown) within housing unit 10.

Voltage device 52, to be described more fully hereinbelow, which is used for protecting against surges of spurious voltages in the telephone line is secured within arms 48 and 50 of grounding unit 20. A single device is used for both protecting tip and ring conductors. In the prior art, by contrast, separate voltage protection was provided for tip and ring conductors. See the aforesaid Dickey patent for an example.

A metallic spring 74 fabricated from a good conductive material such as solder plate phosphor bronze is mounted over the left side 76 of voltage device 52. Neck 78 of cap 80 is inserted into spring 74. The top surface 82 of cap 80 is in contact with the upper, inner surface 84 of housing 10. Spring 74 is lodged within a guide 85 to prevent lateral movement. Spring 86, likewise, is placed over the right side 88 of voltage device 52. Neck 90 of cap 92 is inserted within spring 86. Upper surface 94 of cap 92 is in direct contact with the upper, inner surface 96 of housing 10. In order to prevent its movement, spring 86 is lodged within a guide 87. Caps 80 and 92 are fabricated from brass and have a solder plate finish.

Openings 98 and 100 in the upper surface of housing are offset from the center and provide an access to the tops 82 and 94, respectively, of caps 80 and 92 to test for continuity of the line. The conductive path for one side comprises cap 80, spring 74, metallic clip 102 of voltage device 52, sleeve 24, solder 25 and line pin 22. A similar path may be traced through the other half. The inventive concept for test access is disclosed in U.S. Pat. No. 4,394,620 issued July 19, 1983 to Messrs. A. R. Montalto et al.

In assembling the unit, caps 80 and 92 are inserted, respectively, into springs 74 and 86 and placed within guides 85 and 87 of housing 10 so that the cap tops 82 and 94 are in immediate contact with the inner surface 84 and 96 of housing 10 immediately under openings 98 and 100. Voltage device 52 is then inserted so that the tops of spring clips 102 and 104 make contact, respectively, with springs 74 and 86. The functions of these clips with be disclosed more fully hereinbelow. Base 14 is next inserted within housing 10 so that upper flange 26 of sleeve 24 and the corresponding flange of sleeve 40 make direct contact with ridges 106 and 108 located, respectively, at the bottom surfaces of spring clips 102 and 104. Base 14 when urged upwards causes voltage device 52 to compress springs 74 and 86 until tangs 62 through 68 snap within recesses such as 70 and 72 of housing 10.

Because most of base 14, springs 74 and 86 and housing 10 are disclosed substantially in U.S. Pat. No. 4,434,449 issued Feb. 28, 1985 to Mr. Larry W. Dickey, so much of that disclosure which is necessary is incorporated by reference herein.

Figure 6:
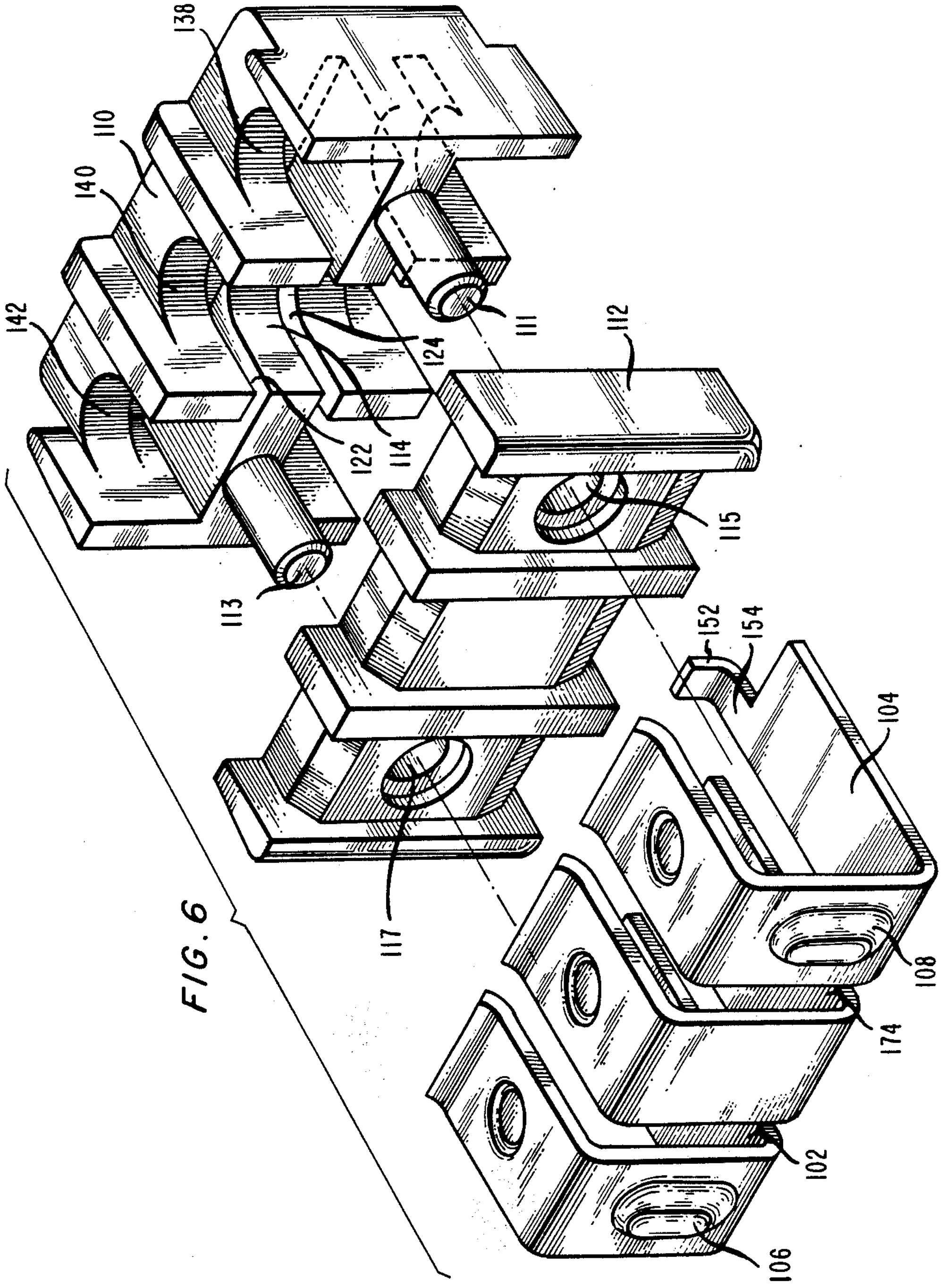
FIG. 6 is an exploded view of the shell for housing solid state electrical components for protection against spurious voltages.
Figure 7:
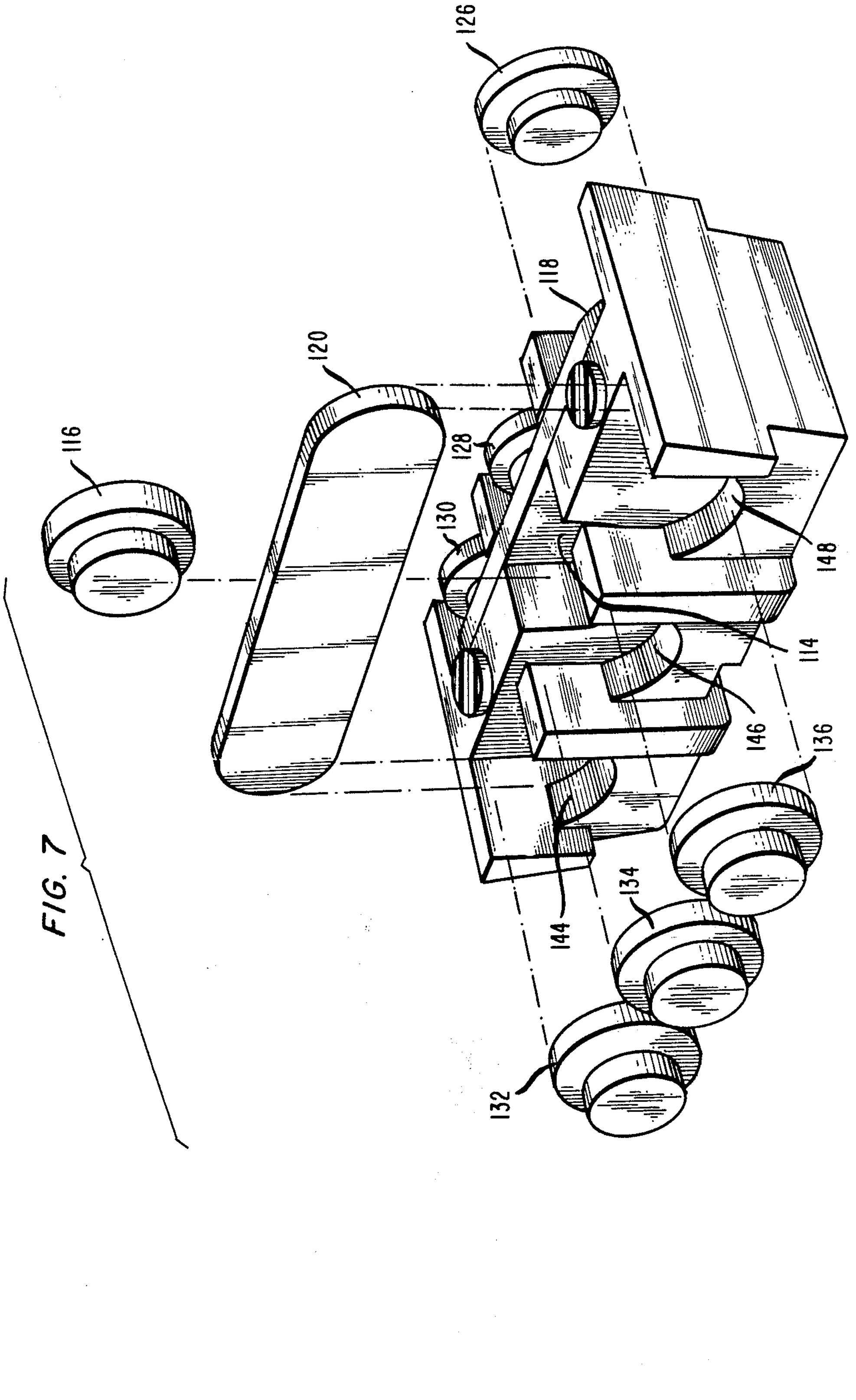
FIG. 7 is an exploded view of the shell of FIG. 6 in partial section with some of the solid state components.

Referring to FIGS. 6 & 7, there is shown the shell of voltage device 52 of FIGS. 1 through 4. The shell comprises a base 110 and a cover 112 fabricated from an insulator. Base 110 has a central recess 114 for receiving a surge-suppressor 116 made from a single chip which includes a silicon controlled rectifier and a Zener diode. The chip is sandwiched between two metal discs, one being smaller than the other in diameter. Surge-suppressor 116 is polarity sensitive but functions with six rectifier diodes 126, 128, 130, 132, 134 and 136, in a manner disclosed by the aforesaid patent issued to R. M. Bulley et al. Because of the steering action of these diodes, the surge-suppressor current is always in the same polarity. The surge-suppressor generates heat on all polarities of the alternating current cycle, that is, on both the positive and negative parts of the cycle. Surgistor 116 is retained in place by two metallic plates 118 and 120 which fit within recesses 122 and 124, respectively.

Metallic plates 118 and 120 are fabricated from electrical grade copper for good thermal conduction. These plates 118 and 120 distribute the heat generated from surge-suppressor 116 to a plurality of diodes to be described hereinbelow. The ability to distribute heat is important in the case of a sustained high voltage fault. The plates 118 and 120 are rounded at the ends for ease in insertion in and removal from base 110 in order to prevent damage thereto.

Recesses 115 and 117 through cover 112 receive posts 111 and 113 which project from base 110. Cover 112 is bonded to base 110 by heat staking posts 111 and 113.

Six diodes 126 through 136 fit into recesses 138 through 148, respectively, in the opposite sides of base 110. When the diodes are manufactured, two metal discs having different diameters sandwich each diode therebetween. Because the aforesaid process is random, some diodes will have the cathode adjacent to the larger disc while others will have the anode adjacent to the larger disc. The diodes are selected so that all the anodes are adjacent to either one disc or the other.

Figure 12:
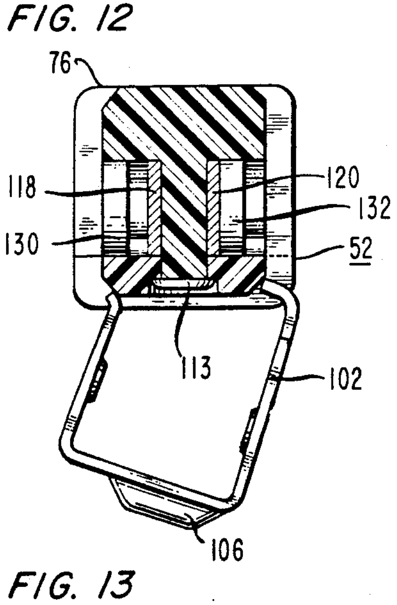
FIGS. 12, 13 and 14 illustrate the method for assembling the solid state devices in the shell.
Figure 13:
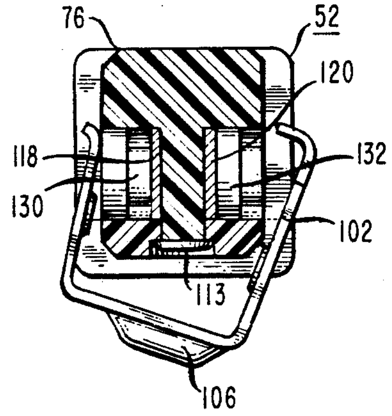
Figure 14:
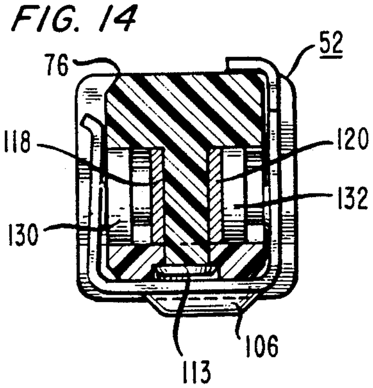

The diodes oriented so that their anodes point in the same direction are held in place within the aforesaid recesses in the sides of base 110 by spring clips 102, 174 and 104 which are fabricated from hardened phosphor bronze and then solder plated. Spring clip 104 will secure diodes 126 and 136 within recesses 138 and 148 of base 110. The top end 152 of clip 104 is bent inwards so that it fits over and grips the top surface of right side of base 110. It can be seen from FIG. 4 that spring 86 rests directly on top end 152 of spring clip 104. Furthermore, material adjacent to neck 154 which connects top end 152 to the rest of spring clip 104 is removed to ensure that diode 136 is not dislodged from recess 148 during assembly. Referring briefly to FIGS. 12, 13 and 14, there are shown diagrams which illustrate the insertion of the spring clips on the base.

Spring clip 104 has a ridge 108 at the bottom surface 109 thereof. The shape of ridge 108 provides a constant surface area of contact with the upper flange of sleeve 40 in all pivot positions of voltage device 52. Likewise, the surface area of contact between ridge 106 of spring clip 102 and upper flange 26 of sleeve 24 will be constant for all pivot positions of voltage device 52. This is necessary to insure that the spring clips 102 or 104 will not become entangled with the upper flange of the respective sleeve or with the inner sides of housing unit 10.

Furthermore, the shape of the ridge on spring clips 102 and 104 is a pivot point that must continue to transfer maximum heat to cause the corresponding sleeve upon which each rests to snap down immediately in response to a force from spring 74 or spring 86 to prevent arcing between the ridges on spring clips 102 and 104 and the upper flanges on sleeves 24 and 40. In the preferred embodiment, the force exerted by each spring 74 or 86 is about one pound.

Figure 8:
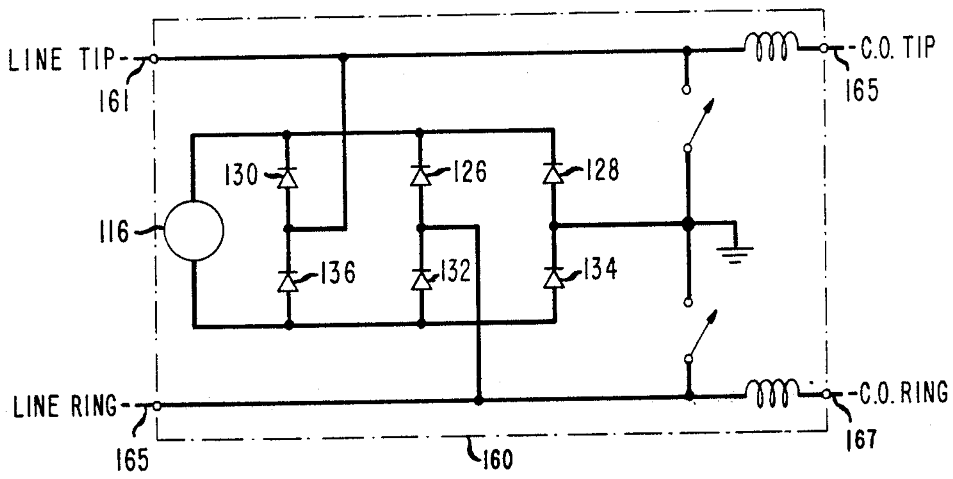
FIGS. 8 and 9 show electrical circuits for the solid state protector.

Referring to FIG. 8, there is shown a circuit diagram for the solid state protector 160 connected between tip conductor 161 aud ring conductor 163 of the telephone line and tip conductor 165 and ring conductor 167 of the central office. The solid state protector 160 is implemented via voltage device 52 which in turn comprises surge-suppressor 116 and diodes 126 through 136. The operation of a similar circuit using steering diodes is disclosed substantially in U.S. Pat. No. 4,408,248 issued Oct. 4, 1983 to Messrs. Raymond M. Bulley et al and will not be repeated herein.

Figure 9:
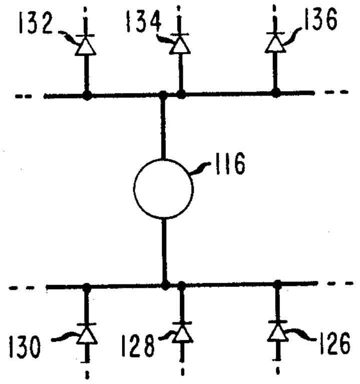

Referring to FIG. 9, the circuit of FIG. 8 has been rearranged to show how the solid state components are actually installed in the shell of FIGS. 6 and 7.

Figure 11:
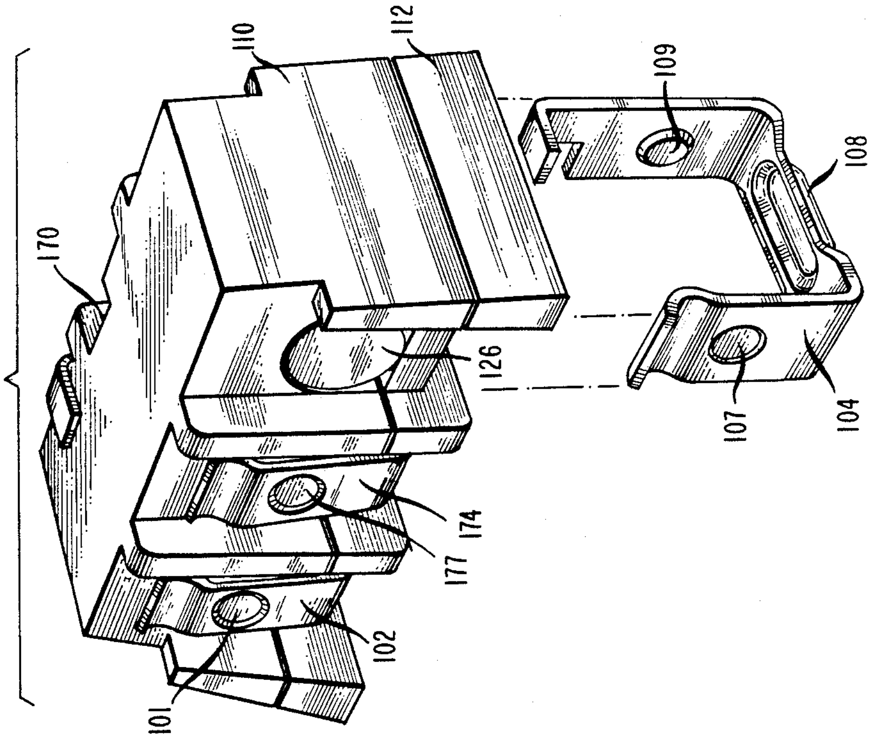
FIGS. 10 and 11 show rear and front isometric views of the shell partially assembled.
Figure 10:
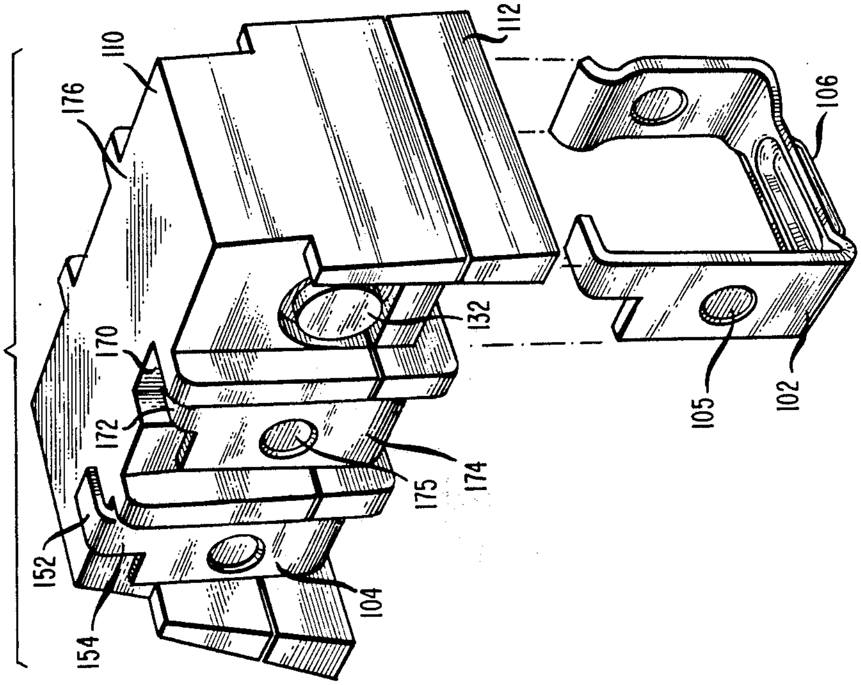

Referring to FIGS. 7, 10 and 11, there is shown a recess 170 for receiving the inwardly bent end 172 of ground spring clip 174. End 172 of ground spring clip 174 is below the top of surface 176 of base 110 so that end 172 does not accidentally touch springs 74 and 86 of FIG. 1. Ground spring clip 174 secures diodes 128 and 134 within the recesses in the sides of base 110. Arms 48 and 50 of grounding unit 20 grips arms 178 and 180 of ground spring clip 174, respectively securing voltage device 52 in position.

Referring more particularly to FIG. 10, there is shown the rear view of voltage device 52 with spring clip 102 removed to expose diode 132. End 152 of spring clip 104 is shown on the top surface 176 of base 110. End 172 of grounding spring clip 174 is shown within recess 170, well below the surface 176 of base 110.

Referring to FIG. 11, there is shown the front view of voltage device 52 with spring clip 104 removed to expose diode 126.

In FIGS. 10 and 11, the arms of spring clips 102, 104 and 174 have convex shaped inner surfaces 101, 105, 107, 109, 175, and 177 formed by stamping. These convex surfaces grip the diodes and retain them within their recesses in base 110.

Figure 15:
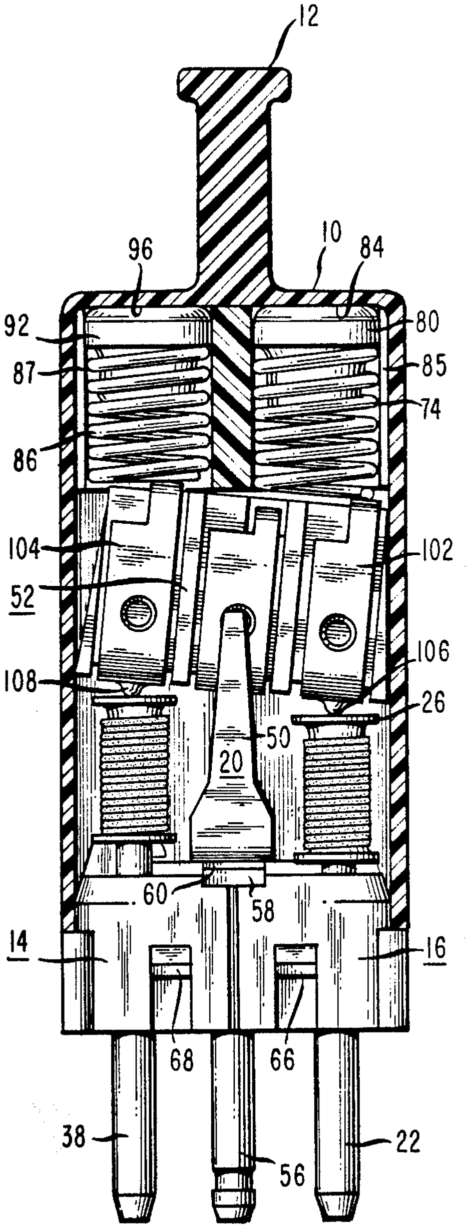
FIG. 15 illustrates the protector after its operation in response to either a sustained spurious current or a spurious voltage.

Referring to FIG. 15, there is shown the solid state protector of FIG. 4 after the device has operated to release sleeve 24 and ground it. Assume a spurious positive voltage appears in the line. This voltage will travel from line pin 22 to flange 26 to ridge 106 to spring clip 102 to diode 132 to plate 118 and then to surge-suppressor 116. When the spurious voltage exceeds 260 volts, (or another predetermined level,) surge-suppressor 116 will begin conducting and the current from the spurious voltage will flow through surge-suppressor 116 through plate 120, through diode 134, through the ground spring clip 174, to grounding unit 20, and safely leaves through ground pin 56. In the event of a sustained fault, heat generated from diodes 126 and 134 and surge-suppressor 116 will be transmitted to sleeve 24 and then to the fusible material 25 bonding sleeve 24 with line pin 22. The current through the solid state components will generate heat and cause the fusible material to melt, releasing sleeve 24. Force from spring 74 will cause voltage device 52 to push sleeve 24 immediately and forcefully downwards to make contact with grounding plate 36 of grounding unit 20. Negative spurious voltages will produce similar actions.

What is claimed is:

1. Apparatus for protecting telephone equipment in a central office or other location against sneak currents or surge voltages by conducting said sneak currents or surge voltages or both to ground potential, said apparatus comprising first and second sneak current protection devices, the devices being positioned along side one another, a single surge voltage protection device extending between and being supported on and electrically connected to said first and second sneak current protection devices, and, first and second springs positioned along side one another, said first spring urging one portion of said surge protection device against said first sneak current protection device and said second spring urging another portion of said surge voltage protection device against said second sneak current protection device, said surge voltage protection device being configured to be pivoted responsive to the operation of one of the said current protection devices and said spring urging said surge voltage protection device against said operated sneak current protection device.

2. Apparatus as in claim 1 wherein said single surge voltage protection device is configured to maintain said electrical connection to both of said sneak current protection devices after being pivoted.

3. Apparatus as in claim 1 wherein said surge voltage protection device comprises a dielectric shell within which is positioned a surge suppressor and first and second electrically conductive plates between which said surge suppressor is sandwiched, first and second diodes being positioned on opposite sides of said plates.

4. Appartaus as in claim 3 wherein said surge voltage protection device further comprises an electrically conductive spring clip having first and second arms that respectively make electrical connection with and press said first and second diodes into electrical engagement with said first and second plates, the plates in turn making electrical connection to said surge suppressor.

5. Apparatus for protecting telecommunications equipment from spurious voltages by dispersing a spurious voltage that appears on a telecommunications line to ground potential via grounding means, the apparatus comprising;

a dielectric enclosure, solid state means located within the dielectric enclosure, the solid state means comprising a surge arrester and a plurality of steering diodes, the surge suppressor and the steering diodes being arranged to permit current to flow in a pre-determined direction to the grounding means for conveying the current to ground potential when the spurious voltage exceed a pre-determined threshold, the surge arrester having first and second surfaces, first and second electrically conductive plates located within the dielectrical enclosure and making electrical contact respective to the first and second surfaces of the surge suppressor, and an electrically conductive clip having first and second arms that respectively clamp a first of the steering diodes into electrical contact with the first plate and a second of the steering diodes into electrical contact with the second plate.

6. An electrical protector assembly for protecting a circuit against excessive current increases and voltage surges, the protector assembly comprising:

a grounding structure;

a dielectric base structure;

two input and two output conductive elements arranged in pairs and supported in the dielectric base structure;

first and second current responsive devices which sense excessive current increases and divert the excessive current increases to the grounding structure, the first and second current responsive devices being supported on the dielectric base structure;

a single surge voltage protection device which conducts voltage surges to the grounding structure, the surge voltage protection device extending between and being supported on the first and second current responsive devices; and first and second springs respectively urging the surge protection device into electrical contact with the first and second current responsive devices, the surge voltage protection device being configured to be pivoted responsive to the operation of one of the current responsive devices and maintain electrical contact with both current responsive devices in its pivoted position.

7. An electrical protector assembly comprising:

a grounding structure;

first and second current responsive devices which sense excessive current increases and divert the excessive current increases to the grounding structure;

a single surge voltage protection device which conducts voltage surges to the grounding structure, the surge voltage protection device extending between and being supported on the first and second current responsive devices; and means for urging the surge voltage protection device into electrical contact with the first and second current responsive devices, the surge voltage protection device being configured to be pivoted responsive to the operation of one of the current responsive devices and maintain electrical contact with both current responsive devices in its pivoted position.

* * * * *